(12) United States Patent
Bedogni et al.

(10) Patent No.: US 10,612,454 B2
(45) Date of Patent: Apr. 7, 2020

(54) GASOLINE INTERNAL COMBUSTION ENGINE, WITH A COMBUSTION PRE-CHAMBER AND TWO SPARK PLUGS

(71) Applicant: Maserati S.p.A., Modena (IT)

(72) Inventors: Fabio Bedogni, Turin (IT); Stefano Magistrali, Turin (IT); Davide Mazzoni, Turin (IT); Ettore Musu, Turin (IT); Gianluca Pivetti, Turin (IT); Paolo Zolesi, Turin (IT)

(73) Assignee: Maserati S.p.A., Modena (IT)

( * ) Notice: Subject to any disclaimer, the term of this patent is extended or adjusted under 35 U.S.C. 154(b) by 0 days.

(21) Appl. No.: 16/122,175

(22) Filed: Sep. 5, 2018

(65) Prior Publication Data
US 2019/0078498 A1 Mar. 14, 2019

(30) Foreign Application Priority Data
Sep. 8, 2017 (EP) ..................................... 17190088

(51) Int. Cl.
*F02B 19/00* (2006.01)
*F02P 15/02* (2006.01)
(Continued)

(52) U.S. Cl.
CPC ...... *F02B 19/1061* (2013.01); *F02B 19/1019* (2013.01); *F02B 19/1023* (2013.01);
(Continued)

(58) Field of Classification Search
CPC .. F02B 19/00; F02B 19/1019; F02B 19/1023; F02B 19/12; F02B 23/08; F02B 19/108; F02B 19/14; F02B 2023/085
See application file for complete search history.

(56) References Cited

U.S. PATENT DOCUMENTS 3,945,365 A * 3/1976 Regueiro ................ F02B 19/12
123/265
4,124,003 A * 11/1978 Abe ........................ F02B 17/00
123/169 EL
(Continued)

FOREIGN PATENT DOCUMENTS

DE 4123592 A1 1/1993
GB 2058910 A 4/1981
JP S52125908 A 10/1977

OTHER PUBLICATIONS

European Search Report for EP 17 190 088.9 dated Nov. 21, 2017. 5 pages.

*Primary Examiner* — Thomas N Moulis
(74) *Attorney, Agent, or Firm* — RMCK Law Group, PLC

(57) ABSTRACT

An engine has, for each cylinder, a combustion chamber and a combustion pre-chamber communicating with the combustion chamber. First and second spark plugs are associated with the pre-chamber and combustion chamber, respectively. Gasoline is injected by an injector device directly into the combustion chamber and/or by an injector device into a cylinder intake duct. There is no device for injecting gasoline, air or an air/gasoline mixture directly into the pre-chamber. The engine operates with an air/gasoline mixture substantially corresponding to stoichiometric, for compatibility with an exhaust system having a trivalent catalyst. The pre-chamber is not used for engine operation with poor dosing, but to increase resistance to engine detonation. The engine can thus be configured with a high compression ratio, with a significant reduction in fuel consumption at the same power level. The second spark plug is only activated at low and medium engine loads to stabilize combustion.

18 Claims, 3 Drawing Sheets

Figure 1:
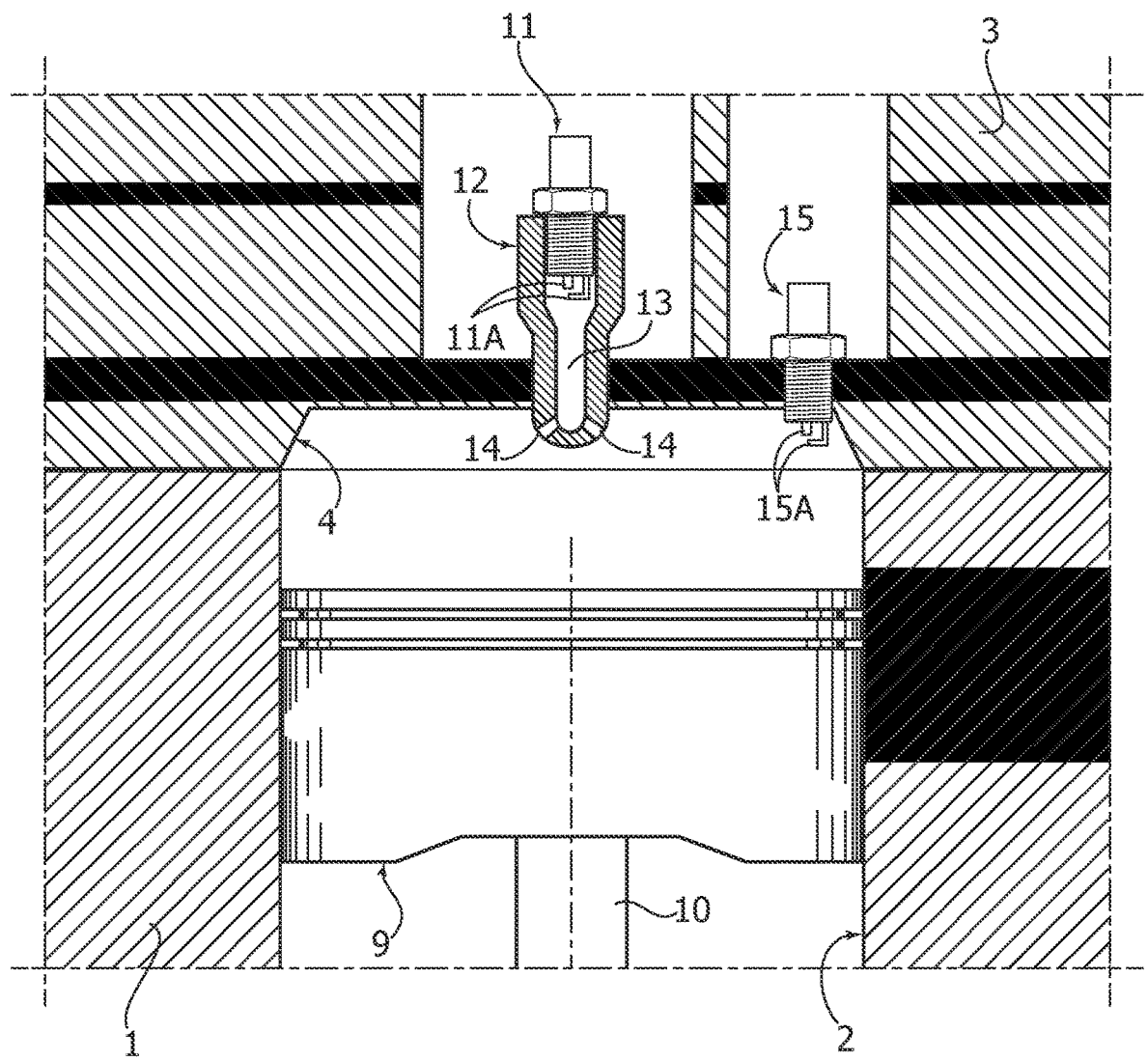

(51) Int. Cl.
*F02B 19/10* (2006.01)
*F02B 19/12* (2006.01)
*F02P 9/00* (2006.01)
*F02B 23/08* (2006.01)
*H01T 13/54* (2006.01)
*F02P 5/15* (2006.01)
*F02P 13/00* (2006.01)
*F02F 1/24* (2006.01)
*F02P 5/152* (2006.01)
*F02B 19/14* (2006.01)

(52) U.S. Cl.
CPC .............. *F02B 19/12* (2013.01); *F02B 23/08* (2013.01); *F02P 9/002* (2013.01); *F02P 15/02* (2013.01); *F02B 19/108* (2013.01); *F02B 19/14* (2013.01); *F02B 2023/085* (2013.01); *F02F 1/242* (2013.01); *F02P 5/152* (2013.01); *F02P 5/1504* (2013.01); *F02P 13/00* (2013.01); *H01T 13/54* (2013.01)

(56) References Cited

U.S. PATENT DOCUMENTS

| | | | |
|---|---|---|---|
| 4,287,862 A * | 9/1981 | Noguchi | F02B 5/00 123/146.5 A |
| 8,006,666 B2 | 8/2011 | Ashida et al. | |
| 8,857,405 B2 | 10/2014 | Attard | |
| 2009/0319156 A1* | 12/2009 | Fujikawa | F02B 23/104 701/103 |
| 2018/0128157 A1* | 5/2018 | VanDerWege | F02B 19/04 |
| 2018/0166862 A1* | 6/2018 | Rabhi | H01T 13/24 |
| 2019/0323415 A1* | 10/2019 | Corrigan | F02B 23/08 |

* cited by examiner

GASOLINE INTERNAL COMBUSTION ENGINE, WITH A COMBUSTION PRE-CHAMBER AND TWO SPARK PLUGS

CROSS-REFERENCE TO RELATED APPLICATION

This application claims priority to European Patent Application No. 17 190 088.9 filed Sep. 8, 2017. The disclosure of the above application is incorporated herein by reference in its entirety.

FIELD OF THE INVENTION

The present invention relates to gasoline internal combustion engines, of the type comprising:
- an engine block with a plurality of cylinders and a cylinder head defining a combustion chamber associated with each cylinder, and at least one intake duct and at least one exhaust duct, provided with respective intake and exhaust valves, associated with each combustion chamber,
- a first spark plug associated with each cylinder, mounted within a support element that is arranged within a cavity of said cylinder head and that defines a combustion pre-chamber having a first end facing the electrodes of said first spark plug, and a second end communicating with the respective combustion chamber through a plurality of orifices,
- a second spark plug associated with each cylinder, having electrodes directly facing the combustion chamber,
- at least one electromagnetically-controlled gasoline injector device associated with each cylinder of the engine, and
- an electronic control unit, configured to control said first spark plug, said second spark plug and said at least one gasoline injector device for each cylinder of the engine.

PRIOR ART

An engine of the type indicated above is, for example, described in the document U.S. Pat. No. 8,006,666 B2.

Internal combustion engines with combustion pre-chambers are known and have been used for a long time, especially in the field of large, stationary lean-burn gas engines, which are suitable for operating with lean fuel mixtures. Various solutions have also been proposed with specific reference to gasoline internal combustion engines. All the solutions currently in use have been designed for lean-burn engines, operating at constant speeds, with an "active" combustion pre-chamber (in which air and/or fuel is directly injected into the combustion pre-chamber) or "passive" (in which no injection is carried out directly into the combustion pre-chamber and the latter is filled by the charge in the cylinder). These known solutions are not compatible with conventional engine exhaust gas after-treatment systems using a trivalent catalyst, as typically used in ignition-controlled engines for motor-vehicle application. Furthermore, the high surface/volume ratio of the combustion pre-chamber does not allow a safe and stable ignition, compatible with current emission regulations, at low temperatures.

As indicated above, an engine having all the characteristics that have been specified at the beginning of the present description is known from the document U.S. Pat. No. 8,006,666 B2. In the solution illustrated in this document, an active combustion pre-chamber is provided, with an injector designed to inject gasoline directly into the combustion pre-chamber and with a first spark plug associated with the combustion pre-chamber and a second spark plug associated with the main combustion chamber. In this known solution, the combustion pre-chamber is mainly used for low loads to ignite very lean mixtures, by also injecting fuel into the combustion pre-chamber. The combustion pre-chamber is dimensioned to operate with lean mixtures, so that at high engine loads, the energy produced is too high and it is necessary to start combustion in the main combustion chamber and delay ignition in the combustion pre-chamber, to reduce the intensity of the jets leaving the combustion pre-chamber. For the same reason, it is also necessary to reduce the fuel intake into the combustion pre-chamber, until it is fully discharged at full load and at high engine speeds.

Similar problems are found in the document disclosed in U.S. Pat. No. 8,857,405 B2, which includes an active combustion pre-chamber, which is associated with a fuel injector, and a single spark plug associated with the combustion pre-chamber. This known solution is also designed to operate with very lean mixtures and is not compatible with the use of a conventional trivalent catalyst. Furthermore, the absence of the second spark plug does not allow stable operation or compliance with regulations concerning emissions at low temperatures and low loads.

OBJECT OF THE INVENTION

The object of the present invention is to provide an internal combustion engine of the type indicated above, which is able to overcome the drawbacks of the above-mentioned solutions and that is particularly compatible with the use of an engine exhaust gas after-treatment system comprising a conventional trivalent catalyst and also possibly a particulate filter or GPF (Gasoline Particulate Filter)

A further object of the present invention is to provide an internal combustion engine of the above-mentioned type, which exhibits high detonation resistance and which can, therefore, be configured with a relatively high compression ratio, so as to allow, at equal power, a reduction of fuel consumption.

A further object of the present invention is to provide an internal combustion engine of the above-mentioned type, which has a simple structure with a reduced number of components and is consequently relatively inexpensive to produce.

A further object of the invention is to provide an internal combustion engine of the above-mentioned type, which allows modulation of the duration of combustion and that, in particular, at high loads, produces a rapid combustion in order to reduce the detonation tendency; at low loads and low engine speeds, it produces less rapid combustion, to reduce noise and that, in the heating steps, it also produces very long combustion to shorten the catalyst heating step, in order to reduce polluting emissions.

A further object of the invention is to provide an internal combustion engine of the above type, which also allows a significant temperature reduction to be obtained of the exhaust gases leaving the engine, at the same power, in order to reduce fuel consumption and emissions at high engine speeds and high loads, due to a lower enrichment of the charge required for the high temperatures of the engine components (particularly the turbocharger turbine, in the case of a supercharged engine).

A further object of the invention is to provide an internal combustion engine that does not exhibit acoustic/vibration phenomena incompatible with the comfort requirements of modern automotive applications.

A further object of the invention is to provide an internal combustion engine in which the temperatures inside the pre-chamber do not generate self-ignition/pre-ignition phenomena.

SUMMARY OF THE INVENTION

In view of achieving these and additional objects, the present invention relates to an internal combustion engine having the characteristics disclosed at the beginning of this description and further characterized in that:
- said at least one gasoline injector device comprises one gasoline injector device for injecting gasoline directly into the combustion chamber and/or one gasoline injector device for injecting gasoline into an intake duct associated with the cylinder,
- no device for injecting gasoline or air or a mixture of air and gasoline directly into said combustion pre-chamber is associated with the combustion pre-chamber,
- the electronic control unit is programmed to control said at least one gasoline injector to produce an air/gas mixture in said combustion chamber according to a ratio essentially corresponding to a stoichiometric dose, or a slightly richer dosage than the stoichiometric dose,
- said electronic control unit is also programmed in such a way that said second ignition spark plug having electrodes directly facing the combustion chamber is only activated at low and medium engine loads, to stabilize the combustion, and is inactive or kept active without any influence on the combustion, for example, by activating it during the expansion or exhaust stage of the cylinder, at higher loads,
- said combustion pre-chamber is dimensioned to reduce the detonation tendency of the engine at high loads, with a volume less than 0.5%, preferably less than 0.3%, of the cylinder capacity of the single cylinder of the engine.

According to a further characteristic of the invention, said electronic control unit is also programmed in such a way that said second spark plug, having electrodes directly facing the combustion chamber, has an ignition timing temporally earlier or delayed with respect to the spark plug associated with the combustion pre-chamber.

In the preferred embodiment, said combustion pre-chamber has sides that are, at least in part, adjacent to a cooling jacket crossed by the engine coolant.

Still preferably, the material and geometry of said combustion pre-chamber allow a high level of heat dissipation. The material chosen for the element defining the pre-chamber has a thermal conductivity greater than 150 W/(m*K), preferably greater than 250 W/(m*K) (such as for example a CuCrZr alloy), and allows the provision of a reduced thickness of the pre-chamber (for example, less than 3 mm), compatible with the mechanical resistance at high temperatures.

Still preferably, the spark plug installed in the pre-chamber has a ground electrode made of a material having a thermal conductivity greater than 50 W/(m*K) (for example, platinum), and a reduced volume compared to conventional production solutions. In particular, a platinum slant-type ground electrode can be used, typically used in engines for competition cars.

Thanks to the aforesaid characteristics, the invention allows a series of relevant advantages to be obtained. In the case of the present invention, the combustion pre-chamber is used to increase the resistance of the engine to detonation and not to operate with lean mixtures, as in the above-discussed known solutions. The increased resistance to detonation allows the engine to be configured with a greater compression ratio, by more than 15% with respect to a conventional engine. For example, from a conventional compression ratio of 9.5:1, a compression ratio of 11:1 or even greater can be obtained, which allows, at equal power, a significant reduction in fuel consumption (even by 30%) to be achieved. The internal combustion engine according to the invention works with stoichiometric or slightly rich mixtures, which allows the use of a conventional trivalent catalyst to reduce NOx, CO and HC emissions, and possibly also the use of a particulate filter or GPF (Gasoline Particulate Filter).

To this end, an important characteristic lies in the absence of systems for injecting air or fuel or a mixture of air and fuel directly into the combustion pre-chamber. In order to reduce the combustion rate and to allow stable operation of the engine at low temperatures and low loads, the present invention also adopts, in addition to the first spark plug associated with the combustion pre-chamber, a second spark plug having electrodes directly facing the main combustion chamber. There is also the possibility that the engine according to the invention has, in addition to the spark plug associated with the combustion pre-chamber, extra spark plugs facing the main combustion chamber. The, or each, spark plug facing the main combustion chamber can be positioned laterally in the combustion chamber, while the combustion pre-chamber is preferably positioned in the center of the combustion chamber.

As indicated above, the engine according to the invention can involve direct fuel injection into the main combustion chamber, or indirect fuel injection, into the intake duct associated with the cylinder, or a mixed direct and indirect injection system, with an injector associated with the main combustion chamber and an injector associated with an intake duct. Direct injection allows reduction of the temperature of the charge at high loads, and maximization of the detonation resistance effect, while indirect injection or mixed injection (direct and indirect) allows better preparation of the charge, by allowing the use of intake ducts without excessive turbulence, typical of high specific power engines, maximizing the advantages of the combustion pre-chamber. Indeed, pre-chamber combustion does not require high turbulences in the main combustion chamber, but is mainly influenced by the design of the combustion pre-chamber and the geometry of the communication holes (diameter, tilt number, and length/diameter ratio) between the main chamber and the pre-chamber. Using only direct injection, it is necessary to increase the turbulence in the combustion chamber to allow adequate preparation of the mix, in particular at low regimes and loads.

As indicated above, the pre-chamber of the engine according to the invention has a volume less than 0.5%, and preferably less than 0.3%, of the capacity of the single cylinder of the engine. With this reduced volume, it is possible to limit the thermal losses caused by the increase in the exchange surface (due to the presence of the combustion pre-chamber) and to have a combustion that is not excessively fast due to very high energy in the combustion pre-chamber.

DETAILED DESCRIPTION OF AN EMBODIMENT

Figure 2:
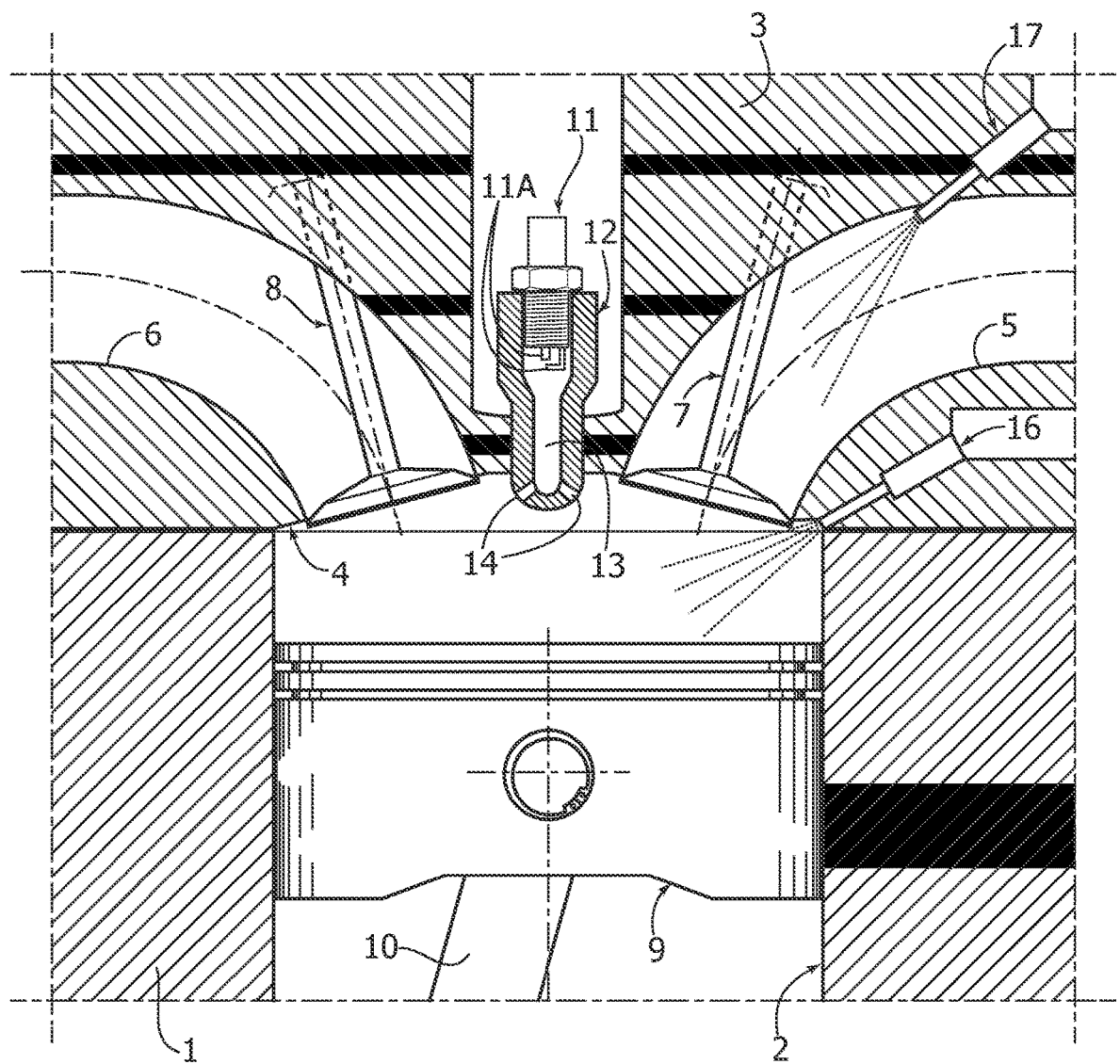
Figure 3:
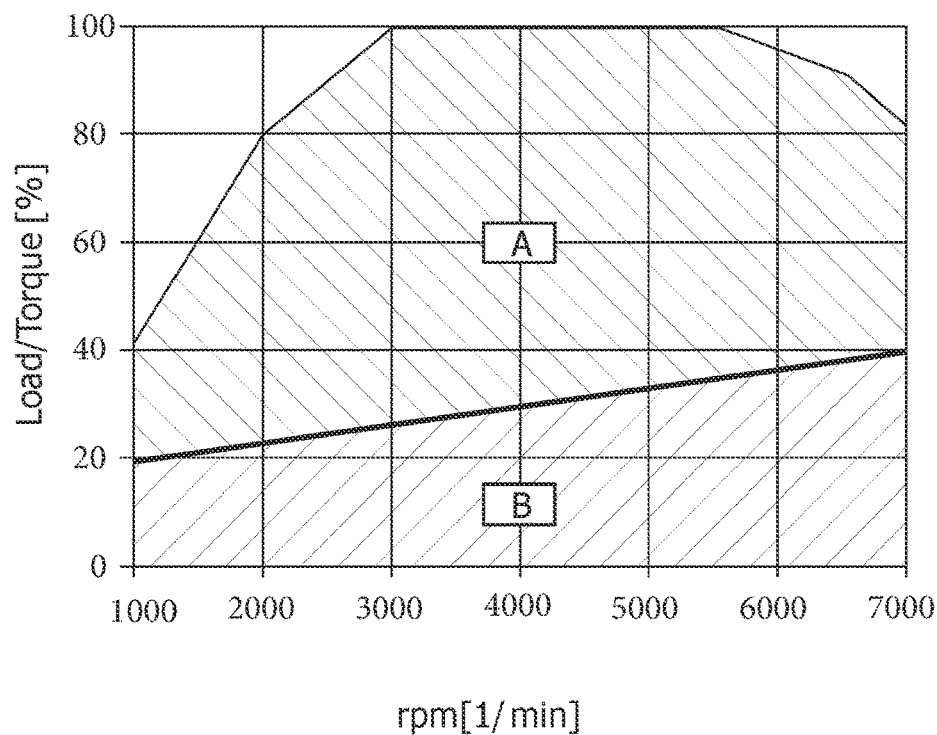
Figure 4:
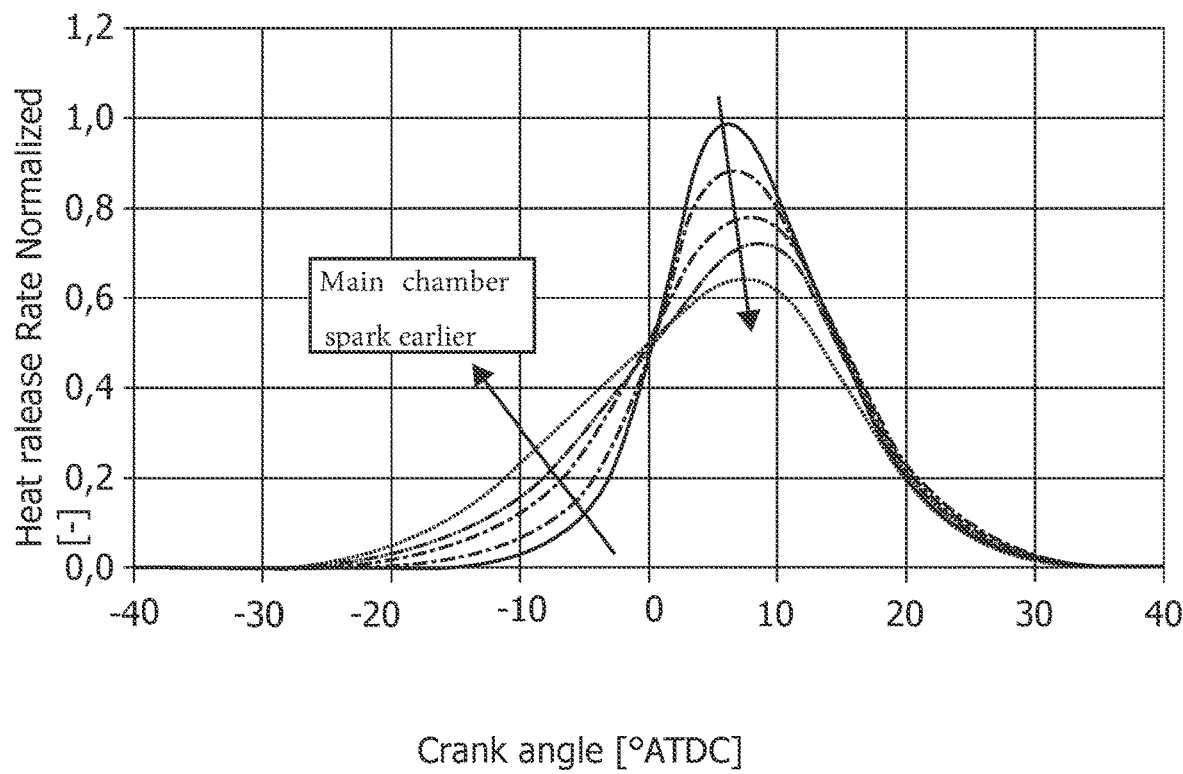

Further characteristics and advantages of the invention will become apparent from the description that follows with reference to the attached drawings, provided purely by way of non-limiting example, wherein:

FIG. 1 is a schematic cross-sectional view of an embodiment of the engine according to the invention, in a sectional plane showing the combustion pre-chamber with the first spark plug and the second spark plug directly associated with the main combustion chamber, FIG. 2 is an additional cross-sectional view of the engine of FIG. 1 in a sectional plane showing the combustion pre-chamber with the associated spark plug, the intake duct and the exhaust duct associated with the cylinder, and one gasoline injector device associated with an intake duct and the other directly associated with the main combustion chamber, FIG. 3 is a diagram showing the range in which the spark plug associated with the combustion pre-chamber and the spark plug directly associated with the main combustion chamber are active, and FIG. 4 is a diagram showing the possibility of varying the heat release rate during combustion by changing the timing of the two spark plugs.

FIGS. 1 and 2 illustrate an embodiment of the engine according to the invention with schematic views. The construction details of the engine are not described and illustrated here, since they are achievable in any way known per se, as is apparent to those skilled in the art. Elimination of these details from the drawings also renders them simpler and easier to understand.

In accordance with the conventional technique, the engine according to the invention comprises an engine block 1 defining a plurality of cylinders 2 (one of which is illustrated in the drawings). Of course, the engine configuration described below with reference to a single cylinder is repeated on each of the other cylinders of the engine. Still in accordance with the conventional technique, a cylinder head 3 is mounted on the engine block 1, in which, at each cylinder 2, the following are formed: a combustion chamber 4, at least one intake duct 5, and at least one exhaust duct 6, with which respective intake and exhaust valves 7, 8 are associated (see FIG. 2).

Conventionally, within each cylinder 2, a piston 9 is movable, produced according to any known configuration, connected by a piston rod 10 (shown only partially in the drawings) to a respective crank of the engine shaft (not shown).

Still with reference to FIGS. 1 and 2, for each cylinder 2, a first spark plug 11 is provided, mounted within a support element 12 defining a combustion pre-chamber 13 inside it. The support element 12 is configured to be mounted within a seat of the engine head 3 which leads into the combustion chamber 4. The support element 12 has a relatively elongated configuration, with one end carrying the spark plug 11 and the opposite end facing the combustion chamber 4 and having a plurality of orifices 14 for communication of the combustion pre-chamber 13 with the combustion chamber 4.

In the preferred embodiment, said combustion pre-chamber has sides that are, at least in part, adjacent to a cooling jacket (not illustrated) crossed by the engine coolant.

The combustion pre-chamber 13 has a relatively elongated configuration, with one end facing the electrodes 11A of the spark plug 11, and the opposite end communicating by means of the orifices 14 with the combustion chamber 4.

As visible in the drawings, in the example shown here, the combustion pre-chamber is centrally arranged with respect to the main combustion chamber 4, and has its main axis parallel to the axis of the respective cylinder. However, different positions and orientations of the pre-chamber 13 with respect to the cylinder 2 are not excluded.

One side of the combustion chamber 4 is provided with a second spark plug 15, with electrodes 15A directly facing the combustion chamber 4.

As mentioned above, the engine according to the invention can be designed to produce a direct injection of gasoline into the combustion chamber 4, by means of an electromagnetically-controlled injector 16, directly associated with the combustion chamber 4, or to produce an indirect injection of gasoline, by means of an electromagnetically-controlled injector 17, associated with the intake duct 5, or to produce a mixed direct and indirect injection, by providing both injector devices 16,17.

The injector devices 16 and 17, the first spark plug 11, and the second spark plug 15 arranged for each cylinder of the engine are controlled by an electronic control unit E (FIG. 2).

As is apparent from the preceding description, the combustion pre-chamber of the engine according to the invention is a "passive" type in that it is not associated with any device for injecting fuel or air or a mixture of air and fuel directly into the combustion pre-chamber 13. During operation, the combustion pre-chamber fills with the charge of the cylinder that enters the combustion pre-chamber by passing through the orifices 14, driven by the piston 9 during the compression step of the charge in the cylinder.

According to an essential characteristic of the present invention, the electronic control unit E is programmed to control the injector device 16 and/or the injector device 17 in order to produce an air/gas mixture in the combustion chamber according to a ratio essentially corresponding to a stoichiometric dose, or a richer dose than the stoichiometric dose, Thanks to this characteristic, the engine according to the invention is able to operate with an engine exhaust gas after-treatment system including a conventional-type trivalent catalyst for treating NOx, CO and HC and a possible particulate filter or GPF (Gasoline Particulate Filter).

The main object of adopting the combustion pre-chamber in the engine according to the invention is not to ignite lean mixtures, as in the case of known systems, discussed above, but to increase the engine resistance to detonation. The increase in resistance to detonation, for example, in the case of a supercharged engine, allows the engine to be configured with a greater compression ratio, by more than 15% with respect to a conventional engine. For example, the engine according to the invention can produce a compression ratio in each cylinder that, instead of having a conventional value typical of a high specific power supercharged engine, for example 9.5:1, has a value greater than or equal to 10:1, and preferably equal to or greater than 11:1. This allows, at equal power, a significant reduction in fuel consumption to be obtained. Additional advantages in reducing fuel consumption are due to the possibility of increasing the specific power of the engine. With the same performance required for a particular application, it is possible to design the engine with a reduced capacity of 25% (downsizing effect). Thanks to the technology described, it is possible, for example, to replace a 4-cylinder engine having two liters of capacity with a 3-cylinder engine having 1.5 liters of capacity, maintaining the same performance and achieving a reduction in consumption on homologative cycles by up to 15%.

The arrangement of the second spark plug 15, in addition to the pre-chamber with the first spark plug 11, aims to reduce and modulate the combustion rate and to allow stable engine operation at low temperatures and low loads.

As indicated above, a mixed direct and indirect injection system is envisaged in the preferred embodiment, with both injector devices 16,17. Direct injection allows the temperature of the charge at high loads to be reduced, and maximization of the detonation resistance effect, while indirect injection allows better preparation of the charge by allowing the use of intake ducts without excessive turbulence, typical of high specific power engines, maximizing the advantages of the combustion pre-chamber. Indeed, pre-chamber combustion does not require high turbulences in the main combustion chamber, but is mainly influenced by the design of the pre-chamber and the geometry of the communication holes between the main chamber and the pre-chamber. Using only direct injection, it is necessary to increase the turbulence in the combustion chamber to allow adequate preparation of the mix, at low regimes and loads. The mixed direct and indirect injection has the advantages of both solutions.

As already indicated, the pre-chamber in the present invention has a volume less than 0.5%, preferably less than 0.3%, of the capacity of the single cylinder of the engine. Adopting a reduced volume as such, it is possible to limit the thermal losses caused by the increase in the exchange surface (due to the presence of the combustion pre-chamber) and to have a combustion that is not excessively fast due to very high energy in the combustion pre-chamber.

The orifices 14 preferably have a diameter in the order of 0.8-1.8 mm. Still preferably, the orifices 14 are 6-9 in number and can be distributed around the combustion pre-chamber axis and/or include a concentric hole with the axis of said pre-chamber. The axis of each hole is inclined with respect to the axis of the pre-chamber 13 by an angle that can be between 0 and 80 degrees.

Preferably, the material selected for the element 12 defining the pre-chamber 13 has a thermal conductivity greater than 150 W/(m*K), preferably greater than 250 W/(m*K). Still preferably, a relatively reduced wall thickness of the pre-chamber is provided, for example less than 3 mm, compatible with the mechanical resistance at high temperatures.

Still preferably, the spark plug installed in the pre-chamber has a ground electrode made of a material having a thermal conductivity greater than 50 W/(m*K) (for example, platinum), and a reduced volume compared to conventional production solutions. In particular, a platinum slant-type ground electrode can be used, typically used in engines for competition cars.

In the engine according to the invention, the electronic control unit E is programmed to control the spark plug 16 associated with the main combustion chamber 4 so as to only activate it at low and medium engine loads to stabilize the combustion, and is inactive or kept active without any influence on the combustion, for example, by activating it during the expansion or exhaust stage of the cylinder, at higher loads.

Preferably, the electronic control unit is also programmed in such a way that said second spark plug, having electrodes directly facing the combustion chamber, has an ignition timing temporally earlier or delayed with respect to the spark plug associated with the combustion pre-chamber.

As already indicated, the combustion pre-chamber is used to reduce the detonation tendency, so that it is dimensioned for high loads, while both the spark plugs are functionally active at low loads. Thanks to this solution, the drawback of the known solutions is overcome, in which the intensity of the jets of the combustion pre-chamber is reduced at high loads. In the case of the present invention, combustion is always carried out throughout the operating range with stoichiometric mixtures (or richer, to reduce component temperatures at high loads and at high engine rotation speeds), so that it is not necessary to inject fuel into the pre-chamber, which simplifies the structure and cost of the engine.

The simplified geometry of the pre-chamber 13, due to the absence of air and/or fuel injection systems, allows better pre-chamber geometry (lower surface/volume ratio) and a reduced volume.

FIG. 3 of the attached drawings shows the engine operating range (load/torque ratio as a function of the engine revolutions), with area B indicated in which both spark plugs are active, and in area A, in which only the spark plug associated with the combustion pre-chamber is activated. As can be seen, for each value of the engine rotation speed, the electronic control unit E is programmed to activate the second spark plug 15 only below a certain transition value of the engine load/torque ratio.

In the specific example illustrated, this transition value increases essentially linearly from a value of about 20% at 1000 rpm up to a value of about 40% at 7000 rpm.

FIG. 4 of the attached drawings shows how it is possible to modulate the heat release rate during combustion, allowing a longer or shorter duration of combustion under certain operating conditions. Modulating the duration of combustion is obtained by varying the moment of ignition between the two spark plugs. Typically, increasing the angular/temporal distance between the moment of ignition of the spark plug with electrodes facing the main combustion chamber relative to the spark plug associated with the pre-chamber results in an increase in the duration of combustion.

The reduced volume of the combustion pre-chamber adopted in the engine according to the present invention allows minimization of the thermal losses due to the increase of the heat transfer surface. The increase in thermal losses is more than compensated by the increase in the compression ratio obtainable due to the increased detonation resistance.

The engine according to the invention also has a number of additional advantages. The spark plug 16 associated with the main combustion chamber allows a significant elongation of the combustion duration with potential benefits during the catalyst heating step. By varying the angular/temporal distance between the activation of the two spark plugs, it is also possible to conveniently modulate the combustion duration, for example, to reduce engine noise during operation at low loads of the engine. The earlier combustion timing and the higher combustion speed allow the beginning of the expansion step in the cylinder to be anticipated with respect to a conventional engine cycle, so as to obtain, in addition to thermodynamic benefits, a significant reduction in the exhaust temperature. Therefore, it is possible to reduce the operating area with rich mixtures used to reduce component temperatures (in particular of the turbine of the supercharger system and catalysts), and significantly improve fuel consumption (up to 30%, at equal power level) at high loads and high speeds of the engine.

Of course, without prejudice to the principle of the invention, the details of construction and the embodiments may vary widely with respect to those described and illustrated purely by way of example, without departing from the scope of the present invention.

What is claimed is:

1. A gasoline internal combustion engine, comprising:
   an engine block with a plurality of cylinders and a cylinder head defining a combustion chamber associated with each cylinder of the plurality of cylinders, and at least one intake duct and at least one exhaust duct, provided with respective intake and exhaust valves, associated with each combustion chamber, a first spark plug associated with each cylinder, mounted within a support element, which is arranged within a seat of said cylinder head and which defines a combustion pre-chamber having a first end facing electrodes of said first spark plug, and a second end communicating with the respective combustion chamber through a plurality of orifices, a second spark plug associated with each cylinder, having electrodes directly facing the respective combustion chamber, at least one electromagnetically-controlled gasoline injector device, associated with each cylinder of the engine, an electronic control unit, configured to control said first spark plug, said second spark plug and said at least one gasoline injector device for each cylinder of the engine, wherein:

said at least one gasoline injector device comprises one gasoline injector device for injecting gasoline directly into the combustion chamber and/or one gasoline injector device for injecting gasoline into the intake duct associated with said combustion chamber, an absence of any device, associated with the combustion pre-chambers, for injecting gasoline or air or a mixture of air and gasoline directly into said combustion pre-chamber, said electronic control unit is programmed to control said at least one gasoline injector device to produce an air/gas mixture in said combustion chamber, according to a ratio substantially corresponding to a stoichiometric dose, or a richer dosage than the stoichiometric dose, said electronic control unit is programmed in such a way that said second ignition spark plug having electrodes directly facing the combustion chamber is only activated at low and medium engine loads to stabilize the combustion, and is inactive, or kept active but without any influence on the combustion by activating it said second ignition spark plug during an expansion or exhaust stage of the cylinder, at higher loads, said combustion pre-chamber is dimensioned in order to reduce a tendency of detonation of the engine at high loads, with a volume less than 0.5% of the capacity of the associated single cylinder of the engine.

2. The internal combustion engine according to claim 1, wherein said at least one gasoline injector device comprises a single injector device for injecting gasoline directly into the combustion chamber.

3. The internal combustion engine according to claim 1, wherein said at least one gasoline injector device comprises a single injector device for injecting gasoline into the intake duct associated with said combustion chamber.

4. The internal combustion engine according to claim 1, wherein said at least one gasoline injector device comprises a first gasoline injector device for injecting gasoline directly into the combustion chamber and a second gasoline injector device for injecting gasoline into the intake duct associated with the combustion chamber.

5. The internal combustion engine according to claim 1, wherein said combustion pre-chamber is substantially arranged at a center of said combustion chamber and said second spark plug is arranged on one side of the combustion chamber.

6. The internal combustion engine according to claim 1, wherein said internal combustion engine comprises two or more spark plugs having electrodes directly facing the combustion chamber.

7. The internal combustion engine according to claim 1, wherein each cylinder and its respective combustion chamber are configured to produce a compression ratio equal to or greater than 10:1.

8. The internal combustion engine according to claim 1, wherein said plurality of orifices each have a diameter of 0.8-1.8 mm, are 6-9 in number, and are distributed around an axis of the combustion pre-chamber, and wherein an axis of each orifice is inclined with respect to the axis of the combustion pre-chamber by an angle between 0 and 80°.

9. The internal combustion engine according to claim 1, wherein the electronic control unit is programmed to activate the second spark plug only below a certain transition value of an engine load/torque ratio.

10. The internal combustion engine according to claim 9, wherein said transition value increases substantially linearly with respect to an increase in engine revolutions.

11. The internal combustion engine according to claim 10, wherein said transition value increases from about 20% at 1000 rpm to a value of about 40% at 7000 rpm.

12. The internal combustion engine according to claim 1, wherein said electronic control unit is also programmed in such a way that said second spark plug having electrodes directly facing the combustion chamber has a temporally equal, earlier or delayed timing with respect to the first spark plug associated with the combustion pre-chamber, depending on the engine load and an engine rotation speed.

13. The internal combustion engine according to claim 1, wherein said combustion pre-chamber has walls that are, at least in part, adjacent to a cooling jacket crossed by the engine coolant.

14. The internal combustion engine according to claim 1, wherein a material constituting an element defining the combustion pre-chamber has a thermal conductivity greater than 150 W/(m*K), and wherein a wall of said element defining the combustion pre-chamber has a thickness less than 3 mm.

15. The internal combustion engine according to claim 1, wherein the first spark plug installed in the combustion pre-chamber has a ground electrode consisting of a material having a thermal conductivity greater than 50 W/(m*K).

16. The internal combustion engine according to claim 1, wherein said combustion pre-chamber is dimensioned in order to reduce a tendency of detonation of the engine at high loads, with a volume less than 0.3% of the capacity of the associated single cylinder of the engine.

17. The internal combustion engine according to claim 1, wherein each cylinder of the plurality of cylinders and its respective combustion chamber are configured to produce a compression ratio equal to or greater than 11:1.

18. The internal combustion engine according to claim 1, wherein a material constituting an element defining the combustion pre-chamber has a thermal conductivity greater than 250 W/(m*K).

* * * * *